(12) United States Patent
Ormandy et al.

(10) Patent No.: US 8,745,592 B1
(45) Date of Patent: Jun. 3, 2014

(54) INPUT SELECTION FOR AUTOMATIC TEST SUITE GENERATION

(75) Inventors: Tavis Ormandy, Zurich (CH); William A. Drewry, Austin, TX (US)

(73) Assignee: Google Inc., Mountain View, CA (US)

( * ) Notice: Subject to any disclaimer, the term of this patent is extended or adjusted under 35 U.S.C. 154(b) by 672 days.

(21) Appl. No.: 12/684,626

(22) Filed: Jan. 8, 2010

(51) Int. Cl.
*G06F 9/44* (2006.01)

(52) U.S. Cl.
USPC ............ 717/126; 717/124; 717/125; 717/130; 717/131

(58) Field of Classification Search
USPC .................................................. 717/124–135
See application file for complete search history.

(56) References Cited

U.S. PATENT DOCUMENTS

| | | | | |
|---|---|---|---|---|
| 7,028,290 | B2 * | 4/2006 | Srivastava et al. ............. | 717/124 |
| 7,594,142 | B1 * | 9/2009 | O'Leary et al. ............. | 714/38.11 |
| 7,865,340 | B2 * | 1/2011 | Fine et al. ........................ | 703/2 |
| 8,276,123 | B1 * | 9/2012 | Deng et al. ..................... | 717/125 |

OTHER PUBLICATIONS

Aggrawal ("Code Coverage Based Technique for Prioritizing Test Cases for Regression Testing"), Sep. 2004.*
Dhaliwal ("Fuzz Testing- SIL 765"), 2008.*
Harman ("Theoretical & Empirical Analysis of Evolutionary Testing and Hill Climbing for Structural Test Data Generation"), Jul. 2007.*
U.S. Appl. No. 12/693,595, Ormany et al., "Coverage Analysis Using Sub-instruction Profiling," filed Jan. 26, 2010.

* cited by examiner

*Primary Examiner* — Chat Do
*Assistant Examiner* — Jae Jeon
(74) *Attorney, Agent, or Firm* — Honigman Miller Schwartz and Cohn LLP

(57) ABSTRACT

Some embodiments provide a system that generates a test suite for a software program. During operation, the system obtains a set of inputs for the software program and determines a coverage of the software program associated with the set of inputs. Next, the system determines a subset of the inputs which substantially provides the coverage of the software program. Finally, the system uses the subset of inputs as the test suite for the software program.

18 Claims, 5 Drawing Sheets

INPUT SELECTION FOR AUTOMATIC TEST SUITE GENERATION

BACKGROUND

1. Field

The present embodiments relate to techniques for generating a test suite comprising test inputs for a software program. More specifically, the present embodiments relate to a method and system for automatically generating the test suite by selecting a unique set of inputs that comprehensively tests the software program.

2. Related Art

Test suites are typically used to test a software program for conformity to a specified set of behaviors or requirements. In particular, a test suite may include a set of test cases, each of which tests a different requirement or specification for the software program. For example, a test suite for determining the correctness of an image decoder may supply a set of images to the image decoder. After processing each image, the output of the image decoder may be analyzed to determine if the image decoder is working correctly.

In addition, a test suite may be created to maximize code coverage of the software program. In other words, the collection of test cases in the test suite may be designed to test as much of the software program as possible. As a result, the selection of inputs for use in test suites may greatly affect the resulting code coverage provided by the test suites. For example, a wide variety of images may be used in a test suite to exercise different features of an image decoder during testing.

However, conventional techniques for selecting inputs to be used in test suites have a number of drawbacks. First, input selection for test suite generation is often accomplished manually. For example, an engineer may generate a test suite for a video decoder by manually browsing through a collection of video files and selecting a subset of the video files that are likely to test a variety of different features in the video decoder. However, manually selecting inputs for software testing is often tedious and incomplete. For example, an engineer may have difficulty selecting a subset of a large number of inputs that provides maximal coverage of a software program. On the other hand, employing a "brute force" approach that attempts to maximize coverage of the software program by supplying an extremely large set of inputs to the software program may be impractical or inefficient. For example, using the set of images available on the Internet to test an image decoder may be infeasible and unnecessary.

Hence, what is needed is a technique for selecting inputs for use in test suites that both efficiently and thoroughly tests the software program.

SUMMARY

Some embodiments provide a system that generates a test suite for a software program. During operation, the system obtains a set of inputs for the software program and determines a coverage of the software program associated with the set of inputs. Next, the system determines a subset of the inputs which substantially provides the coverage of the software program. Finally, the system uses the subset of inputs as the test suite for the software program.

In some embodiments, the system also alters one or more inputs from the subset of inputs prior to using the subset of inputs as the test suite.

In some embodiments, a fuzz-testing technique is used to alter the one or more inputs.

In some embodiments, determining the coverage of the software program involves determining a set of individual coverages associated with the inputs, wherein each of the individual coverages corresponds to a portion of the software program covered by one of the inputs, and obtaining the coverage of the software program as a union of the individual coverages.

In some embodiments, determining the subset of the inputs providing the coverage of the software program involves ordering the inputs based on the individual coverages of the inputs and assigning the ordered inputs to elements of the software program using the individual coverages of the inputs.

If an input from the inputs is assigned to one or more of the elements, the system includes the input in the subset of the inputs.

In some embodiments, each of the elements corresponds to at least one of an instruction, an opcode, and a sub-instruction block.

In some embodiments, the union of the individual coverages corresponds to the elements of the software program to which the inputs are assigned.

In some embodiments, the test suite is used in at least one of regression testing, unit testing, and correctness testing for the software program.

BRIEF DESCRIPTION OF THE FIGURES

In the figures, like reference numerals refer to the same figure elements.

DETAILED DESCRIPTION

Figure 1:
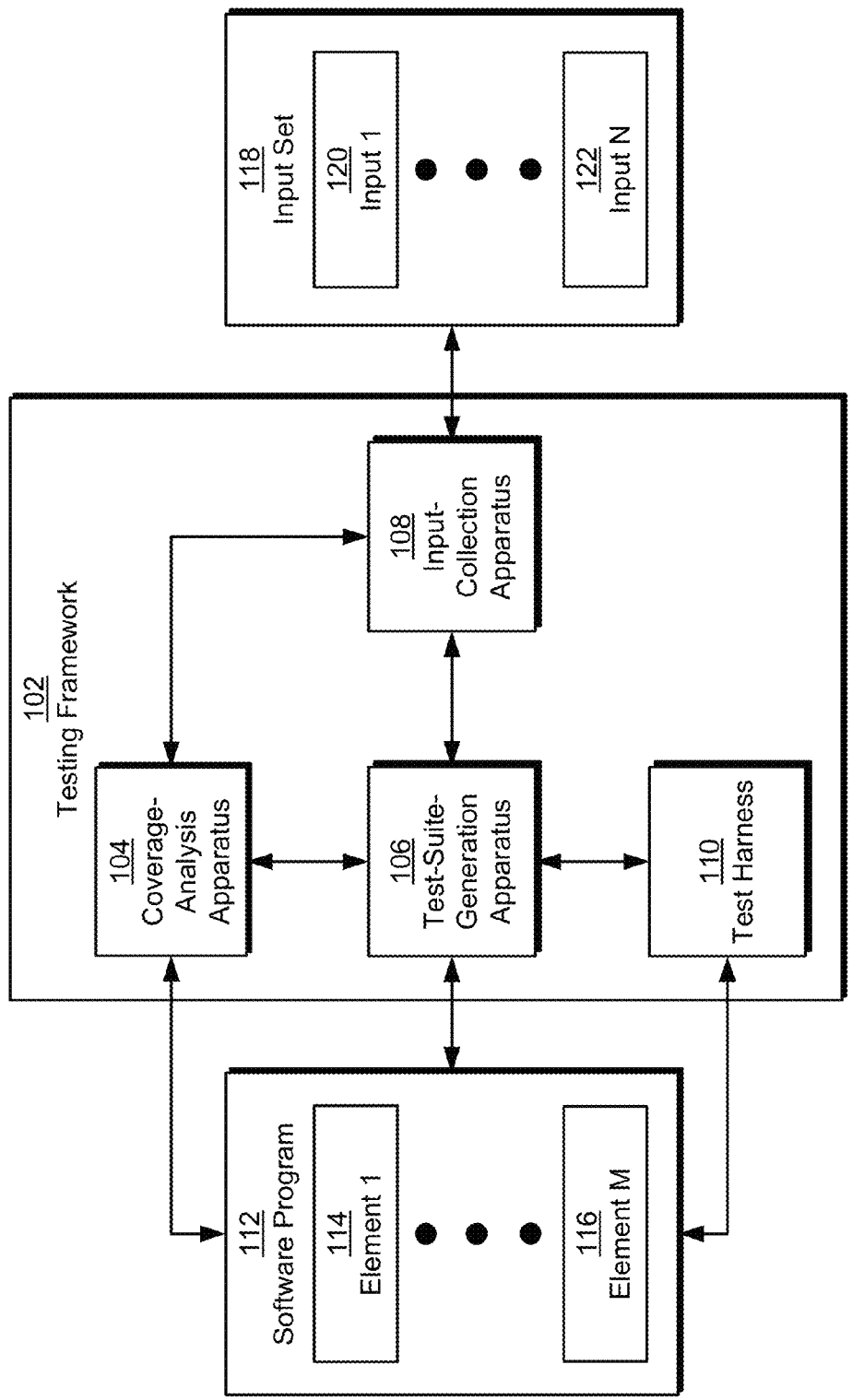
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for generating a test suite for a software program, such as an application, a library, a database, an operating system, and/or a device driver. The test suite may include a set of test cases that verify different requirements and/or specifications of the software program. The test cases may be generated from a set of inputs to the software program such that different inputs to the software program enable different parts of the software program to be tested.

More specifically, embodiments provide a method and system for automated selection of the inputs used to generate the test suite. To select the inputs, a large set of inputs for the software program may first be obtained and a coverage of the software program associated with the large set of inputs determined. A subset of the inputs substantially providing the same coverage may then be selected from the large set of inputs and used as the test suite for the software program. To expand the coverage of the software program by the subset of inputs, one or more of the subset of inputs may be altered using a fuzz-testing technique prior to inclusion in the test suite. As a result, embodiments may enable a test suite to be created from a reduced set of inputs that both efficiently and thoroughly tests the software program.

FIG. 1 shows a schematic of a system in accordance with an embodiment. As shown in FIG. 1, the system includes a testing framework 102 for testing a software program 112. Testing framework 102 includes a coverage-analysis apparatus 104, a test-suite-generation apparatus 106, an input-collection apparatus 108, and a test harness 110. Each of these components is described in further detail below.

Software program 112 may correspond to a standalone application, operating system, enterprise application, database, library, device driver, and/or other type of software. In addition, software program 112 may be executed in a variety of environments. For example, software program 112 may be executed on a single desktop computer or workstation, or software program 112 may be distributed across multiple servers within a data center.

Software program 112 includes a set of elements (e.g., element 1 114, element m 116). Each element may correspond to an instruction, opcode, function, and/or other unit of software program 112 that is executed by a processor (e.g., a central processing unit (CPU)) to implement the functionality of software program 112. In other words, the elements may correspond to machine code instructions, bytecode instructions, and/or other executable operations that make up software program 112.

Those skilled in the art will appreciate that software program 112 may include a number of bugs, faults, and/or vulnerabilities. The bugs, faults, and/or vulnerabilities may cause software program 112 to execute incorrectly, crash, hang, and/or grant access to unauthorized applications or users. As a result, the development process of software program 112 may involve testing to detect defects in software program 112. Defects found through testing may then be fixed (e.g., patched) to improve the performance and correctness of software program 112.

In one or more embodiments, testing framework 102 is used to test software program 112 for bugs, faults, vulnerabilities, and/or other defects. For example, testing framework 102 may perform unit testing, regression testing, fuzz testing, and/or correctness analysis on software program 112. The operation of testing framework 102 may be automated and/or manually controlled by a user. For example, testing framework 102 may include a command line interface (CLI) that accepts commands related to testing of software program 112 from the user and/or a graphical user interface (GUI) that interacts with the user through graphical objects such as menus, buttons, windows, toolbars, and/or other GUI elements. Alternatively, some or all of the testing activities performed by testing framework 102 may be automated by a script associated with testing framework 102.

Regardless of the mode of operation, testing framework 102 may test software program 112 using a test suite that examines software program 112 for conformity to a set of specifications and/or requirements. Furthermore, the test suite may be generated from an input set 118 containing one or more inputs (e.g., input 1 120, input n 122) to software program 112. For example, the test suite may include a number of images that are used to test various features in an image decoder.

Those skilled in the art will appreciate that test suites for software program 112 may provide inadequate coverage of software program 112 and/or test software program 112 inefficiently. For example, a test suite for software program 112 may be generated from inputs that are manually selected by an engineer or tester. The test suite may include a large number of test cases that repetitively test the same elements (e.g., features, branches, etc.) in software program 112. The test suite may also fail to include test cases that provide coverage of other elements of software program 112, thus omitting the other elements from testing by testing framework 102.

To mitigate issues associated with test suite code coverage and efficiency, testing framework 102 may include functionality to automate the selection of inputs used in generating test suites for software program 112. The selected inputs may allow the test suites to provide maximal coverage of software program 112 while reducing repetitiveness associated with testing the same elements of software program 112.

Input-collection apparatus 108 may include functionality to obtain a large input set 118 (e.g., input 1 120, input n 122) for software program 112. For example, input-collection apparatus 108 may have access to one or more repositories that contain possible inputs for software program 112. Along the same lines, input-collection apparatus 108 may correspond to a web crawler that collects inputs from the Internet. Alternatively, input-collection apparatus 108 may generate the inputs randomly and/or according to specifications of inputs accepted by software program 112. For example, input-collection apparatus 108 may generate inputs for a signal-processing software program as a set of digital periodic waveforms (e.g., sine waves, square waves, sawtooth waves, etc.) with randomized parameters (e.g., amplitudes, frequencies, phases, harmonics, etc.).

The set of inputs obtained by input-collection apparatus 108 may then be provided to coverage-analysis apparatus 104 for selection of one or more inputs to be used in a test suite for software program 112. In particular, coverage-analysis apparatus 104 may determine a coverage of software program 112 associated with the set of inputs (e.g., input set 118) obtained by input-collection apparatus 108. Coverage-analysis apparatus 104 may then determine a subset of the inputs that substantially provides the same coverage of software program 112 and use the subset of inputs to generate the test suite for software program 112. Coverage-analysis apparatus is described in further detail below with respect to FIG. 2.

Test-suite-generation apparatus 106 may obtain the subset of inputs from coverage-analysis apparatus 104 and/or input-collection apparatus 108 and generate the test suite from the subset of inputs. For example, test-suite-generation apparatus 106 may generate a test case from each input in the subset of inputs and assemble the test suite from the test cases. Test-suite-generation apparatus 106 may also alter one or more inputs from the subset of inputs prior to using the input(s) in the test suite. In particular, test-suite-generation apparatus 106 may apply a fuzz-testing technique to randomize various attributes of the input(s). The alteration of inputs by test-suite-generation apparatus 106 may further extend the coverage of software program 112 by the test suite. For example, test-suite-generation apparatus 106 may apply a combination of random mutations and hill climbing to the input(s) to explore additional error handling and execution paths of software program 112.

Finally, test harness 110 may execute the test suite on software program 112. In one or more embodiments, test harness 110 enables communication between software program 112 and testing framework 102 and allows test cases to be run on software program 112. For example, test harness 110 may hook test cases within the test suite to developed code within software program 112 and monitor the behavior and outputs of software program 112 under the executing test cases. Test harness 110 may also provide the monitored behavior and outputs to an analysis mechanism, which may analyze the collected data to determine the validity of software program 112. As a result, test harness 110 may enable regression testing, unit testing, correctness analysis, and/or bug finding to be performed on software program 112 by testing framework 102.

Figure 2:
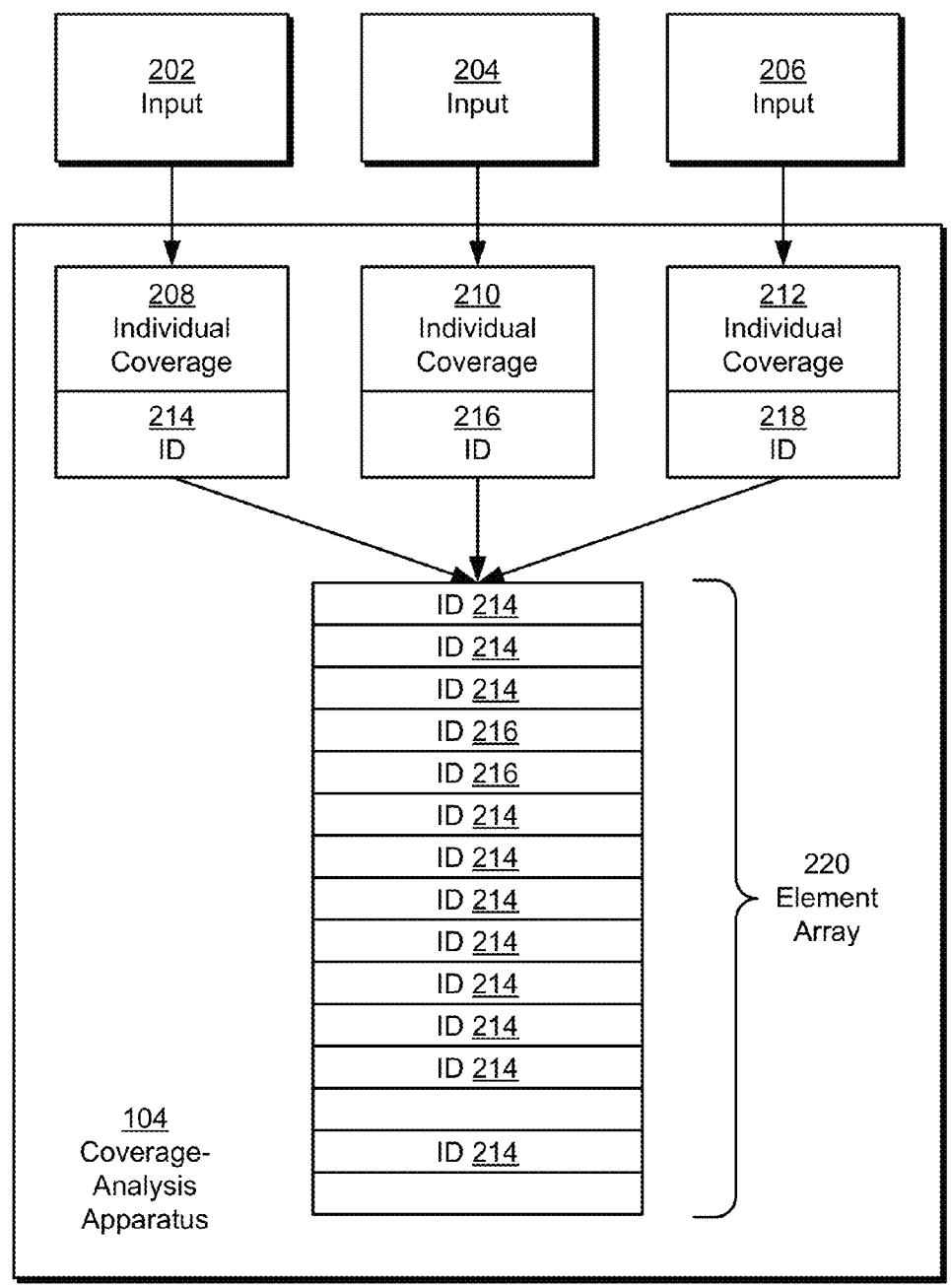
FIG. 2 shows the operation of a coverage-analysis apparatus in accordance with an embodiment.

FIG. 2 shows the operation of coverage-analysis apparatus 104 in accordance with an embodiment. As described above, coverage-analysis apparatus 104 may select a subset of inputs to be used in a test suite for a software program, such as software program 112 of FIG. 1. Furthermore, coverage-analysis apparatus 104 may select the subset of inputs such that the subset of inputs provides the same coverage of the software program as a much larger set of inputs from which the subset is selected. In other words, coverage-analysis apparatus 104 may facilitate the generation of an efficient and comprehensive test suite for the software program using the selected subset of inputs.

As shown in FIG. 2, coverage-analysis apparatus 104 obtains and analyzes three inputs 202-206 for inclusion in the test suite. For each input 202-206, coverage-analysis apparatus 104 determines an individual coverage 208-212 associated with the input and assigns an identifier (ID) 214-218 to the input. Each individual coverage 208-212 may correspond to the portion of the software program covered by the respective input 202-206. For example, individual coverage 208 may correspond to the set of elements in the software program that is executed if input 202 is provided to the software program. To determine individual coverages 208-212, coverage-analysis apparatus 104 may use dynamic binary instrumentation techniques.

IDs 214-218 may allow coverage-analysis apparatus 104 to identify each input 202-206. For example, IDs 214-218 may correspond to integer keys for inputs 202-206; ID 214 for input 202 may be set to 0, ID 216 for input 204 may be set to 1, and ID 218 for input 206 may be set to 2. Coverage-analysis apparatus 104 may also assign IDs 214-218 to inputs 202-206 based on other criteria. For example, coverage-analysis apparatus 104 may use the filenames of input files as IDs for the input files to enhance readability for a human reader (e.g., a tester); input files with the same filenames may be distinguished from one another by appending a numerical key and/or code to the end of each input file's ID.

Coverage-analysis apparatus 104 may then populate an element array 220 with IDs 214-218 based on individual coverages 208-212. In one or more embodiments, element array 220 corresponds to a data structure that includes an element for each element of the software program. Consequently, coverage-analysis apparatus 104 may determine the coverage of the software program by assigning elements in element array 220 to inputs 202-206 using individual coverages 208-212.

More specifically, the coverage of the software program may be represented by the elements in element array 220 to which an ID 214-218 of an input 202-206 is assigned. Because elements in element array 220 may be populated using individual coverages 208-212 of all available inputs 202-206, the coverage of the software program may be obtained as a union of individual coverages 208-212. As shown in FIG. 2, element array 220 includes 13 elements populated with an ID 214-218 from inputs 202-206 and two empty elements. As a result, the coverage of the software program associated with inputs 202-206 may correspond to 13 of 15 elements in the software program.

Coverage-analysis apparatus 104 may also order inputs 202-206 based on individual coverages 208-212 prior to assigning inputs 202-206 to elements in element array 220. In particular, coverage-analysis apparatus 104 may order inputs 202-206 according to an increasing size of individual coverages 208-212. For example, individual coverages 208-212 may contain 11, 4, and 2 elements of the software program, respectively. To populate element array 220, coverage-analysis apparatus 104 may first assign two elements of element array 220 to ID 218 using individual coverage 212, then assign four elements of element array 220 to ID 216 using individual coverage 210, and finally assign 11 elements of element array 220 to ID 214 using individual coverage 208.

Such ordering of inputs 202-206 may minimize redundancy in testing the same elements of the software program using different inputs by maximizing the likelihood that inputs with greater individual coverage of the software program are included the test suite, and that inputs with less individual coverage of the software program are omitted from the test suite. For example, element array 220 includes only ID 214 and ID 216, suggesting that an earlier assignment of ID 218 to one or more elements of element array 220 was overwritten by subsequent assignments of ID 214 and ID 216 to elements of element array 220. In other words, the assignment of ordered inputs to element array 220 may preclude inputs with individual coverages that are included entirely in the individual coverages of other inputs from inclusion in the test suite.

The contents of element array 220 may then be used by coverage-analysis apparatus 104 to generate a test suite for the software program. In particular, only input 202 and input 204 may be used in the test suite because element array 220 only contains ID 214 and ID 216. Furthermore, because inputs 202-204 provide the same coverage of the software program as all three inputs 202-206, coverage-analysis apparatus 104 may enable the generation of test suites that both provide maximal coverage of the software program and efficiently test the software program.

In one or more embodiments, coverage-analysis apparatus 104 determines the coverage of the software program using sub-instruction blocks in place of complex instructions in the software program. Such use of sub-instruction blocks may facilitate the generation and/or modification of the test suite and may maximize coverage of the software program by the test suite. Coverage analysis using sub-instruction blocks is discussed in a co-pending non-provisional application by the same inventors as the instant application and filed on the same day as the instant application entitled "Coverage Analysis Using Sub-Instruction Profiling," having serial number TO BE ASSIGNED, and filing date TO BE ASSIGNED, which is incorporated herein by reference.

Figure 3:
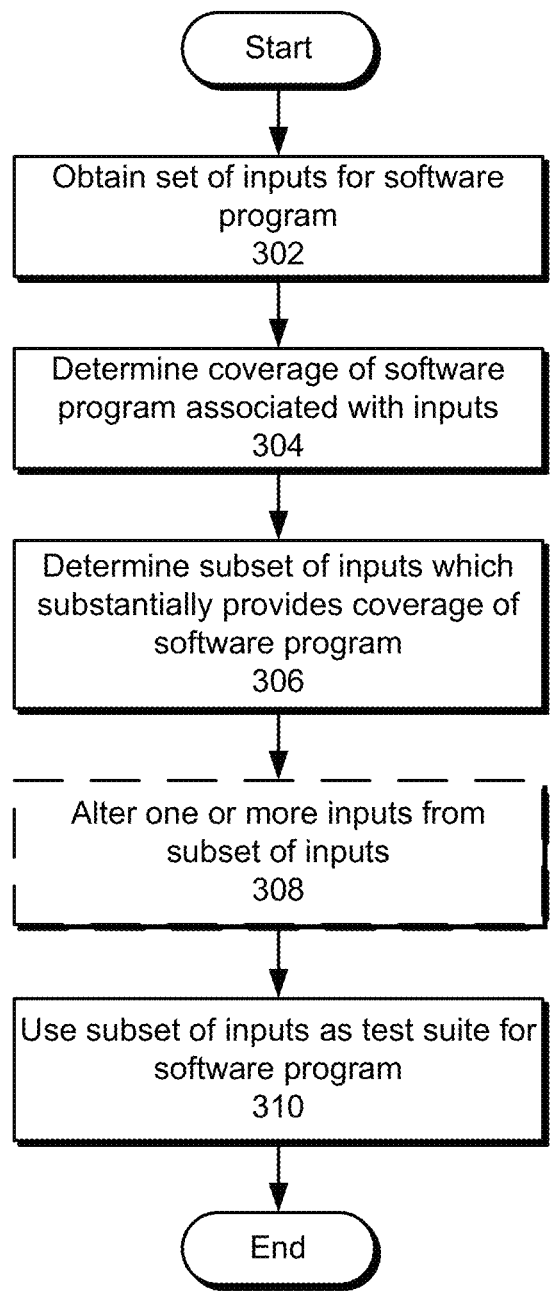
FIG. 3 shows a flowchart illustrating the process of generating a test suite for a software program in accordance with an embodiment.

FIG. 3 shows a flowchart illustrating the process of generating a test suite for a software program in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, a set of inputs for the software program is obtained (operation 302). The set of inputs may be obtained by accessing one or more repositories and/or browsing or crawling hypertext documents. The set of inputs may also be generated. In one or more embodiments, the set of inputs is too large to allow for efficient or practical testing of the software program using all of the inputs. For example, the set of inputs may correspond to a set of images obtained from the Internet by a web crawler. Instead, the test suite may be generated using a smaller subset of the inputs that is selected for both code coverage and efficiency.

Next, a coverage of the software program associated with the set of inputs is determined (operation 304). The coverage of the software program may be obtained as the union of the individual coverages associated with the set of inputs. Furthermore, the union of the individual coverages may be calculated by assigning elements of the software program to inputs, as discussed below with respect to FIG. 4.

After the coverage of the software program is determined, a subset of the inputs which substantially provides the coverage of the software program is determined (operation 306). In particular, the subset of inputs may test the same portions of the software program as the entire set of inputs but require much less computation and/or time. For example, the subset of inputs may correspond to only 6% of the entire set of inputs obtained in operation 302, resulting in a savings corresponding to the time and computation required to test the software program using the remaining 94% of inputs.

One or more inputs from the subset of inputs may optionally be altered (operation 308). For example, the input(s) may be altered using a fuzz-testing technique to further expand the coverage of the software program by the subset of inputs. The subset of inputs is then used as the test suite for the software program (operation 310). Moreover, the test suite may be used to test the software program in a variety of contexts. For example, the test suite may be used in regression testing, unit testing, and/or correctness analysis of the software program.

Figure 4:
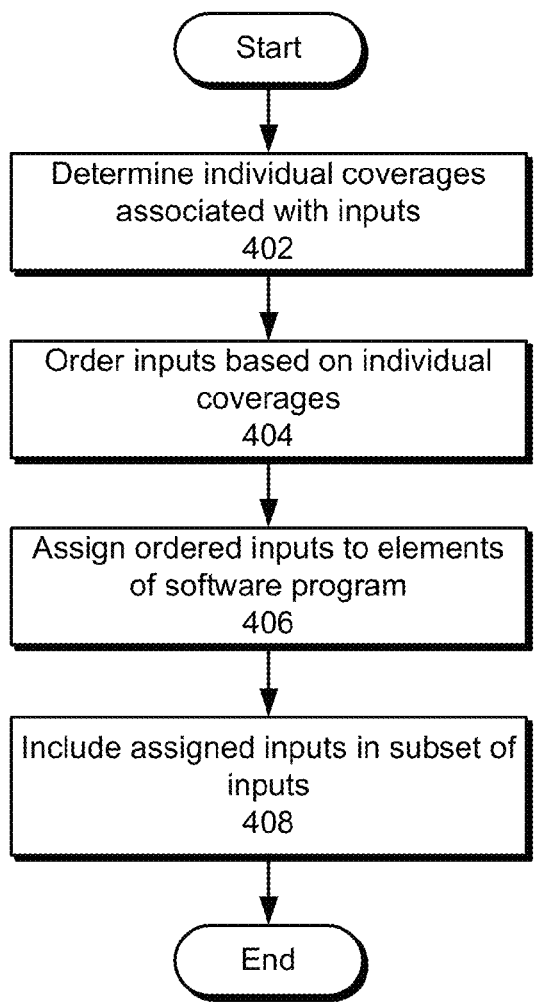
FIG. 4 shows a flowchart illustrating the process of selecting a subset of inputs for a test suite in accordance with an embodiment.

FIG. 4 shows a flowchart illustrating the process of selecting a subset of inputs for a test suite in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

Initially, individual coverages associated with a set of inputs are determined (operation 402). Each individual coverage may be determined using a dynamic binary instrumentation technique and may correspond to the portion of a software program (e.g., software program 112 of FIG. 1) covered by an input. Next, the inputs are ordered based on the individual coverages (operation 404). For example, the inputs may be ordered based on ascending individual coverage such that inputs with smaller individual coverages are ordered first and individuals with larger individual coverages are ordered last.

The ordered inputs are then assigned to elements of the software program (operation 406) using the individual coverages of the inputs. Each element may correspond to an instruction, function, opcode, and/or sub-instruction block. As described above, the ordered inputs may be assigned to the elements by populating elements of an element array representing the software program with the inputs.

Finally, the inputs that are assigned to elements of the program are included in the subset of the inputs (operation 408). Because the inputs are assigned to elements in order of increasing individual coverage, inputs with larger individual coverages are more likely to "overwrite" the assignments of inputs with smaller individual coverages, thus reducing the likelihood that the same portions of the software program are tested multiple times by different inputs. Furthermore, because assignment of inputs to elements takes place for all of the inputs, the resulting set of elements with assignments may be taken as the union of the individual coverages of the inputs, or in other words, the coverage of the program as provided by all of the inputs. As a result, the subset of inputs may maintain the same coverage of the program as the full set of inputs while minimizing redundant testing of the same portions of the software using different inputs.

Figure 5:
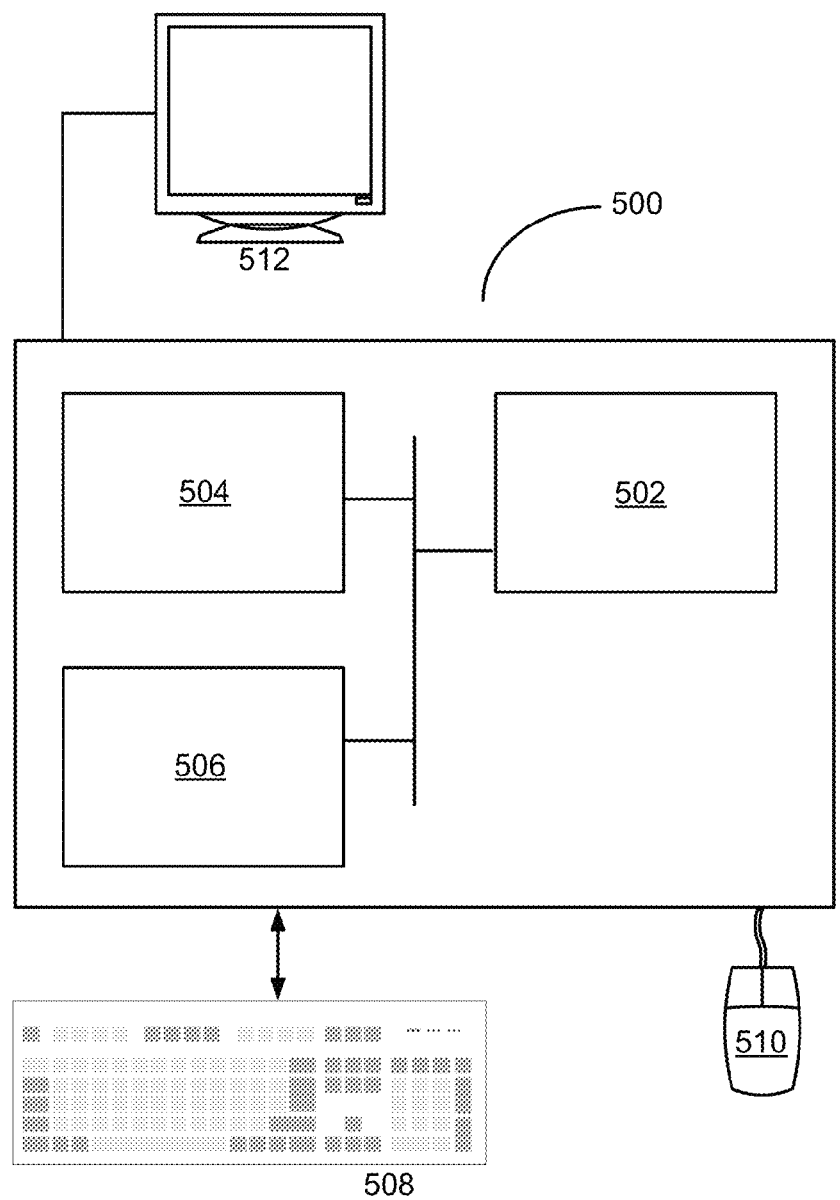
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In particular, computer system 500 may execute a testing framework that generates and executes test suites for a software program. The testing framework may include an input-collection apparatus that obtains a set of inputs for the software program. The validation framework may also include a coverage-analysis apparatus that determines a coverage of the software program associated with the set of inputs and determines a subset of the inputs providing the same coverage. Furthermore, the validation framework may include a test-suite-generation apparatus that creates a test suite for the software program from the subset of inputs. Finally, the validation framework may include a test harness that executes the test suite on the software program.

In addition, one or more components of computer system 500 may be remotely located and connected to the other components over a network. Portions of the present embodiments (e.g., coverage-analysis apparatus, input-collection apparatus, test-suite-generation apparatus, test harness, etc.) may also be located on different nodes of a distributed system that implements the embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method for generating a test suite for a software program, comprising:
    obtaining a set of inputs for the software program, the software program comprising a set of elements;
    determining a coverage of the software program associated with the set of inputs by:
        determining a set of individual coverages associated with the inputs, wherein each of the individual coverages corresponds to a portion of the software program covered by one of the inputs; and
        obtaining the coverage of the software program as union of the individual coverages;
    selecting a subset of the inputs that provides the same coverage of the software program as the set of inputs from which the subset is selected by:
        generating an element array that includes an entry for each element of the set of elements of the software program;
        ordering the set of inputs based on an increasing size of the individual coverages of the inputs such that for a first input with a first individual coverage and a second input with a second individual coverage, the first input ordered before the second input when the first individual coverage is less than the second individual coverage;
        assigning the ordered inputs to entries of the element array based on the ordering such that the first input is assigned before the second input, wherein an input of the ordered inputs is assigned to an entry of the element array when the input covers the element of the software program corresponding to the entry; and
        when a subsequent input from the ordered inputs is assigned to an entry of the element array already having a previous input from the ordered inputs assigned thereto, wherein the individual coverage of the subsequent input includes the individual coverage of the previous input, overwriting the assignment of the previous input with an assignment of the subsequent input to the element;
    altering one or more inputs of the selected subset of inputs; and
    after altering the one or more inputs, using the subset of inputs as the test suite for the software program.

2. The computer-implemented method of claim 1, wherein determining the coverage of the software program involves using binary instrumentation techniques.

3. The computer-implemented method of claim 1, wherein each of the elements corresponds to at least one of an instruction, an opcode, and a sub-instruction block.

4. The computer-implemented method of claim 1, wherein the union of the individual coverages corresponds to the elements of the software program to which the inputs are assigned.

5. The computer-implemented method of claim 1, wherein the test suite is used in at least one of regression testing, unit testing, and analyzing a correctness of the software program.

6. The computer-implemented method of claim 1, wherein altering one or more inputs of the selected subset of inputs comprises applying a fuzz testing technique including a combination of random mutations and hill climbing to the one or more inputs to extend the coverage of the software program.

7. A system for generating a test suite for a software program executing on a computing processor, the system comprising:
    an input-collection apparatus obtaining a set of inputs for the software program, the software program comprising a set of elements;
    a coverage-analysis apparatus configured to:
        determine, using the computing processor, a coverage of the software program associated with the set of inputs by:
            determining a set of individual coverages associated with the inputs, wherein each of the individual coverages corresponds to a portion of the software program covered by one of the inputs; and
            obtaining the coverage of the software program as a union of the individual coverages; and
        selecting a subset of the inputs that provides the same coverage of the software program as the set of inputs from which the subset is selected, wherein the subset of the inputs is selected by:
            generating an element array that includes an entry for each element of the set of elements of the software program;
            ordering the set of inputs based on an increasing size of the individual coverages of the inputs such that for a first input with a first individual coverage and a second input with a second individual coverage, the first input ordered before the second input when the first individual coverage is less than the second individual coverage;
            assigning the ordered inputs to entries of the element array based on the ordering such that the first input is assigned before the second input, wherein an input of the ordered inputs is assigned to an entry of the element array when the input covers the element of the software program corresponding to the entry; and
            when a subsequent input from the ordered inputs is assigned to an entry of the element array already having a previous input from the ordered inputs assigned thereto, wherein the individual coverage of the subsequent input includes the individual coverage of the previous input, overwriting the assignment of the previous input with an assignment of the subsequent input to the element;
    a test suite generation apparatus configured to alter one or more inputs from the selected subset of inputs; and
    a test harness using the altered subset of inputs as the test suite for the software program.

8. The system of claim 7, wherein determining the coverage of the software program involves using binary instrumentation techniques.

9. The system of claim 7, wherein each of the elements corresponds to at least one of an instruction, an opcode, and a sub-instruction block.

10. The system of claim 7, wherein the union of the individual coverages corresponds to the elements of the software program to which the inputs are assigned.

11. The system of claim 7, wherein the test suite is used in at least one of regression testing, unit testing, and analyzing a correctness of the software program.

12. The system of claim 7, wherein the test suite generation apparatus is configured to alter one or more inputs from the selected subset of inputs by applying a fuzz testing technique including a combination of random mutations and hill climbing to the one or more inputs to extend the coverage of the software program.

13. A non-transitory computer-readable storage medium storing instructions that when executed by a computer cause the computer to perform a method for generating a test suite for a software program, the method comprising:

obtaining a set of inputs for the software program, the software program comprising a set of elements;

determining a coverage of the software program associated with the set of inputs;

determining a set of individual coverages associated with the inputs, wherein each of the individual coverages corresponds to a portion of the software program covered by one of the inputs; and obtaining the coverage of the software program as a union of the individual coverages;

selecting a subset of the inputs that provides the same coverage of the software program as the set of inputs from which the subset is selected by;

generating an element array that includes an entry for each element of the set of elements of the software program;

ordering the set of inputs based on an increasing size of the individual coverages of the inputs such that for a first input with a first individual coverage and a second input with a second individual coverage, the first input ordered before the second input when the first individual coverage is less than the second individual coverage;

assigning the ordered inputs to entries of the element array based on the ordering such that the first input is assigned before the second input, wherein an input of the ordered inputs is assigned to an entry of the element array when the input covers the element of the software program corresponding to the entry; and when a subsequent input from the ordered inputs is assigned to an entry of the element array already having a previous input from the ordered inputs assigned thereto, wherein the individual coverage of the subsequent input includes the individual coverage of the previous input, overwriting the assignment of the previous input with an assignment of the subsequent input to the element;

altering one or more inputs of the selected subset of inputs; and after altering the one or more inputs, using the subset of inputs as the test suite for the software program.

14. The non-transitory computer-readable medium of claim 13, wherein determining the coverage of the software program involves using binary instrumentation techniques.

15. The non-transitory computer-readable medium of claim 13, wherein each of the elements corresponds to at least one of an instruction, an opcode, and a sub-instruction block.

16. The non-transitory computer-readable medium of claim 13, wherein the union of the individual coverages corresponds to the elements of the software program to which the inputs are assigned.

17. The non-transitory computer-readable medium of claim 13, wherein the test suite is used in at least one of regression testing, unit testing, and analyzing a correctness of the software program.

18. The non-transitory computer-readable medium of claim 13, wherein altering one or more inputs of the selected subset of inputs comprises applying a fuzz testing technique including a combination of random mutations and hill climbing to the one or more inputs to extend the coverage of the software program.

* * * * *

UNITED STATES PATENT AND TRADEMARK OFFICE
CERTIFICATE OF CORRECTION

PATENT NO.         : 8,745,592 B1
APPLICATION NO.    : 12/684626
DATED              : June 3, 2014
INVENTOR(S)        : Ormandy et al.

Page 1 of 1

It is certified that error appears in the above-identified patent and that said Letters Patent is hereby corrected as shown below:

In the Claims

Column 9, claim 1, line 29, should read "obtaining the coverage of the software program as a union of the individual coverages".

Signed and Sealed this
Sixth Day of January, 2015

Michelle K. Lee
*Deputy Director of the United States Patent and Trademark Office*